US012081640B2

(12) United States Patent
Praske

(10) Patent No.: US 12,081,640 B2
(45) Date of Patent: Sep. 3, 2024

(54) DEVICE AND METHOD FOR CONNECTING A FIELD DEVICE TO A COMMUNICATION SYSTEM

(71) Applicant: Turck Holding GmbH, Halver (DE)

(72) Inventor: Heinz-Peter Praske, Gladbeck (DE)

(73) Assignee: Turck Holding Gmbh, Halver (DE)

( * ) Notice: Subject to any disclaimer, the term of this patent is extended or adjusted under 35 U.S.C. 154(b) by 0 days.

(21) Appl. No.: 18/297,221

(22) Filed: Apr. 7, 2023

(65) Prior Publication Data

US 2023/0328158 A1 Oct. 12, 2023

(30) Foreign Application Priority Data

Apr. 12, 2022 (DE) ...................... 10 2022 108 807.3

(51) Int. Cl.
*H04L 69/08* (2022.01)
*H04L 12/40* (2006.01)

(52) U.S. Cl.
CPC .............. *H04L 69/08* (2013.01); *H04L 12/40* (2013.01); *H04L 2012/40273* (2013.01)

(58) Field of Classification Search
CPC ..................... H04L 69/08; H04L 12/40; H04L 2012/40273
USPC ........................................................ 709/230
See application file for complete search history.

(56) References Cited

U.S. PATENT DOCUMENTS

| | | | |
|---|---|---|---|
| 10,271,766 B1 * | 4/2019 | Parker, Jr. ............ | A61B 5/0833 |
| 10,296,483 B2 | 5/2019 | Vogt et al. | |
| 10,432,412 B2 | 10/2019 | Alley et al. | |
| 11,256,238 B1 * | 2/2022 | Nixon ..................... | H04L 67/12 |
| 2003/0196000 A1 * | 10/2003 | Magnussen ........... | H04L 12/403 |
| | | | 710/1 |

(Continued)

FOREIGN PATENT DOCUMENTS

| | | |
|---|---|---|
| DE | 19646219 A1 | 12/1997 |
| DE | 10211939 A1 | 10/2003 |

(Continued)

OTHER PUBLICATIONS

Search Report by the German Patent and Trademark Office, issued in DE 10 2022 108 807.3 to which this application claims priority, mailed Mar. 30, 2023.

(Continued)

*Primary Examiner* — Tauqir Hussain
(74) *Attorney, Agent, or Firm* — Tautz & Schuhmacher LLC; Georg Hasselmann

(57) ABSTRACT

An apparatus for connecting a field device to a communication system includes a field device interface for connecting the apparatus to the field device, a communication interface for connecting the apparatus to the communication system, a protocol conversion unit, and a switching unit. The switching unit is configured to recognize a protocol used by the field device and to establish a connection between the field device and the communication interface via the protocol conversion unit depending on the recognized protocol. Further, a method of connecting a field device to a communication system includes recognizing a protocol used by the connected field device, performing a protocol conversion depending on the recognized protocol, and establishing a connection between the connected field device and the communication system.

8 Claims, 2 Drawing Sheets

(56) References Cited

U.S. PATENT DOCUMENTS

| | | | | |
|---|---|---|---|---|
| 2003/0200323 | A1* | 10/2003 | Dold | G05B 19/042 709/230 |
| 2005/0228509 | A1 | 10/2005 | James | |
| 2008/0126665 | A1* | 5/2008 | Burr | H04L 12/413 710/316 |
| 2010/0077111 | A1* | 3/2010 | Holmes | H04L 12/40013 710/33 |
| 2010/0156183 | A1* | 6/2010 | Kah | G05B 19/042 307/66 |
| 2014/0122855 | A1* | 5/2014 | Maneval | G05B 19/0426 713/1 |
| 2015/0127876 | A1* | 5/2015 | Erni | G06F 13/4282 710/315 |
| 2015/0351084 | A1* | 12/2015 | Werb | H04W 12/08 370/329 |
| 2017/0200152 | A1* | 7/2017 | Winkler | G06Q 20/321 |
| 2017/0265233 | A1* | 9/2017 | Beha | H04W 12/50 |
| 2018/0013582 | A1* | 1/2018 | Sotriffer | H04L 12/4625 |
| 2021/0081346 | A1* | 3/2021 | Nixon | H04L 69/18 |
| 2021/0144877 | A1* | 5/2021 | Lessmann | H04L 12/46 |
| 2022/0075354 | A1* | 3/2022 | Nixon | G05B 19/41835 |
| 2022/0078238 | A1* | 3/2022 | Nixon | G05B 19/4185 |
| 2022/0078252 | A1* | 3/2022 | Nixon | H04L 67/12 |
| 2022/0078267 | A1* | 3/2022 | Nixon | G05B 19/0423 |
| 2022/0129782 | A1* | 4/2022 | Nixon | G05B 19/4155 |
| 2022/0221844 | A1* | 7/2022 | Amaro, Jr. | G06F 11/0736 |
| 2022/0291704 | A1* | 9/2022 | Abe | H03M 1/1028 |
| 2022/0302956 | A1* | 9/2022 | Yoshioka | H04L 12/02 |
| 2022/0404786 | A1* | 12/2022 | Amaro, Jr. | G05B 19/0421 |
| 2022/0404790 | A1* | 12/2022 | Amaro, Jr. | G05B 19/41885 |
| 2022/0404801 | A1* | 12/2022 | Amaro, Jr. | G05B 19/0426 |
| 2022/0404811 | A1* | 12/2022 | Amaro, Jr. | G05B 19/41835 |
| 2022/0405217 | A1* | 12/2022 | Amaro, Jr. | G06F 13/20 |
| 2022/0407769 | A1* | 12/2022 | Thornton | H04L 41/0622 |
| 2023/0023908 | A1* | 1/2023 | Lobenstein | H02M 3/156 |

FOREIGN PATENT DOCUMENTS

| | | |
|---|---|---|
| DE | 102012111682 A1 | 6/2014 |
| DE | 102017007535 A1 | 2/2018 |
| EP | 1833006 A2 | 9/2007 |
| WO | 2021152010 A1 | 8/2021 |

OTHER PUBLICATIONS

European Search Report issued in EP 23 161 332.4, which is a counterpart hereof, mailed Aug. 18, 2023, and english machine translation thereof.

* cited by examiner

DEVICE AND METHOD FOR CONNECTING A FIELD DEVICE TO A COMMUNICATION SYSTEM

CROSS REFERENCE TO RELATED APPLICATIONS

This application claims priority to German patent application DE 10 2022 108 807.3 filed on Apr. 12, 2022, which is hereby incorporated by reference in its entirety.

TECHNICAL FIELD

The disclosure relates to a device and a method for connecting a field device to a communication system.

BACKGROUND

Currently, analog field devices, for example in process technology, are often operated with a Highway Addressable Remote Transducer (HART) interface. Communication via the HART interface is used for parameterization of the field devices as well as for diagnosis and transmission of further accompanying information. Establishing and terminating communication processes with the field devices and the exchange of data can be done by means of a point-to-point connection via a HART modem and a PC. Furthermore, communication can take place via decentralized peripheral devices that provide analog modules with HART controllers and serve as HART multiplexers.

Compared to more modern Ethernet-based solutions, the communication via the HART protocol is slow and rather unsuitable for permanent data exchange of larger data volumes.

A bus physics was developed which offers the advantages of HART and at the same time meets the requirements for fast data transport of large data volumes. Similar to the HART protocol, the so-called Advanced Physical Layer (APL) uses a 2-wire interface for communication with the field device and the power supply. With APL, data is transmitted via Ethernet-based protocols.

A large part of the currently existing field devices, optionally sensors and/or actuators, use the HART protocol on the one hand for configuration and parameterization and on the other hand for the transmission of further device information. For example, so-called dynamic variables are transmitted, such as a device temperature or a media temperature for a flow measurement. In the case of dynamic variables, transmission takes place approximately twice per second. The main measured value of a sensor or the setpoint of an actuator is mapped by the standardized current signal 4-20 mA as an analog signal on a 2-wire interface, whereby a refresh time of about 20 ms is achieved.

The HART protocol optionally provides an FSK (Frequency Shift Keying) procedure. A signal is modulated onto the 2-wire measuring signal of 4-20 mA. A transmitter supply separator can provide the necessary energy to supply the field devices (so-called active input). The measuring signal then consists of the current consumption of the field device in the range of 4-20 mA. In case of a power demand which cannot be provided by an active input, such field devices are supplied with a separate auxiliary energy supply. The measuring signal of 4-20 mA is generated directly by the field device, which is connected to a so-called passive input for further processing.

The communication via APL is carried out optionally by means of Ethernet-based protocols and differs significantly from the HART protocol, which is based on a vastly differently designed physical layer.

In practice, the challenge is that the renewal of existing systems and conversion to Ethernet-based communication will take a long time, and that in the meantime different technologies will have to be used side by side.

WO 2021/152010 A1 discloses an SPE-based device adapter for connecting a non-Ethernet-capable field device to an Ethernet-based process control system. US 10,432,412 B2 describes a configurable interface for a process control device. U.S. Pat. No. 10,296,483 B2 discloses a fieldbus network. DE 10 2017 07 535 A1 describes a power-over-Ethernet-based field device.

SUMMARY

It is therefore an object of the disclosure to provide an apparatus and method for connecting a field device to a communication system that maximize compatibility with various components.

This object is achieved by an apparatus and a method for connecting a filed device to a communication system as disclosed herein.

The apparatus for connecting a field device to a communication system has a field device interface for connecting the apparatus to the field device, a communication interface for connecting for connecting the apparatus to the communication system, a protocol conversion unit, and a switching unit. The switching unit recognizes a protocol used by the field device when connecting the field device and establishes a connection between the connected field device and the communication interface via the protocol conversion unit as a function of the recognized protocol. The method for connecting a field device to a communication system includes providing a connected field device, recognizing a protocol used by the connected field device; performing a protocol conversion depending on the recognized protocol; and establishing a connection between the connected field device and the communication system.

Furthermore, depending on the recognized protocol, the connection between the connected field device and the communication interface can also be established directly, bypassing the protocol conversion unit.

The connected field device can be designed in a manner known per se and comprise, for example, a sensor and/or an actuator. For example, a sensor records a measured variable and makes it available via a data interface, while an actuator is configured to receive a control variable and set a setting accordingly.

The protocol conversion unit may be coupled to the communication interface. For example, the protocol conversion unit can be arranged between the switching unit and the communication interface of the device.

The protocol conversion unit is configured to handle a communication with the field device via a protocol used by the field device and to connect it with a communication via a further protocol for the communication system. That is, communication is enabled between the communication system and the field device even though they use different protocols.

The switching unit recognizes/detects which protocol the connected field device uses and, depending on the protocol used, establishes a data link between the field device and the switching unit. If the field device uses a protocol that is compatible with the communication system, then optionally a data connection of the field device with the communication system is established without the protocol having to be converted.

That is, the switching unit is optionally configured to switch between different indirect and/or direct data connections of the field device with the communication system.

The device is configured to be connected to the communication system via the communication interface and to perform communication via the communication system. Optionally, therefore, regardless of the direct compatibility of the protocols used, the field device can be connected to the communication system and integrated into a larger system, such as a system of field devices and control devices.

In one exemplary embodiment of the device, the communication system comprises a bus system, optionally an Ethernet-based bus system.

This advantageously enables connection of the field device to a bus system. Common bus systems allow good data transmission with high speed and large data volumes.

Different bus systems known per se can be used. Optionally, the bus system uses an Ethernet-based standard for communication. For example, the communication system can be designed as a field bus.

In a further exemplary embodiment, if the protocol used by the connected field device is a HART protocol, the switching unit is configured to establish a connection between the connected field device and the protocol conversion unit. In this case, the protocol conversion unit further comprises a HART master device.

Advantageously, this allows a HART-compatible field device to be connected to a communication system, regardless of the protocol used by the latter. Optionally, a connection can be made to an Ethernet-compatible bus system. The communication system can therefore be used with an Ethernet-compatible protocol, even if not all field devices are configured to this communication.

In a further exemplary embodiment, if the protocol used by the connected field device is a HART protocol, a current loop can be activated for supplying the field device with 4-20 mA.

This advantageously enables operation of the field device even if further protocols not compatible with the HART protocol are used by the communication system. In this case, the power supply required for this can be provided by the device, even if other comparable devices are missing. Optionally, this can be provided by a HART master device comprised by the device.

In one exemplary embodiment, the switching unit is configured to establish a direct connection between the connected field device and the communication interface if the transmission physics used by the connected field device conforms to the APL standard and uses an Ethernet-based protocol.

This also allows directly APL-compatible field devices to be used with the device and connected to the communication system. The device can then be operated in the manner of an ordinary switch. Optionally, there is no need for conversion between an Ethernet-compatible communication system and the APL-compatible field device because the latter is also Ethernet-compatible.

In another exemplary embodiment, the field device interface is configured to be connected to multiple field devices. The field devices can use different protocols.

As a result, the device can advantageously be used to aggregate communication links to various field devices and connect them to the communication system.

Optionally, several connections of the device may be combined in a peripheral module, which is connected to a communication module. In this case, the device comprises the two modules to which one or more field devices can be connected on the peripheral module side and to which the communication system can be connected on the communication module side. Optionally, a communication module is provided for each connection of the peripheral module; if there are multiple connections for field devices, the same amount of communication modules can then be provided, each of which is assigned to a connection and which are combined in a higher-level module.

Optionally, a remote I/O system may be implemented. In this case, one device or a plurality of devices can be connected to an internal module bus via the communication modules, with the module bus being coupled to the communication system via a downstream gateway. Advantageously, this allows several devices formed as remote I/O modules to be interconnected so that they are connected to the communication system via a common port.

In a further exemplary embodiment, during the recognition of the protocol used by the field device the switching unit is configured to first perform a connection recognition according to the Ethernet standard and, if no Ethernet-based protocol was recognized, to then perform a connection attempt using the HART protocol.

This advantageously ensures that first the possibility of a data connection operated with lower voltage via an Ethernet protocol is checked before the higher voltage values of a connection are checked according to the HART protocol. In this way, damage to communication components due to overload and impermissible maximum values can be avoided.

In the method for connecting a field device to a communication system, a recognition of a protocol used by the field device is performed when the field device is connected. Depending on the recognized protocol, a connection is established between the connected field device and the communication system in such a way that a protocol conversion is performed.

Optionally, the method is designed to operate the device. It therefore has the same advantages as the device according to the disclosure.

BRIEF DESCRIPTION OF THE DRAWINGS

The disclosure will now be described with reference to the drawings wherein.

DESCRIPTION OF EXEMPLARY EMBODIMENTS

Figure 1A:
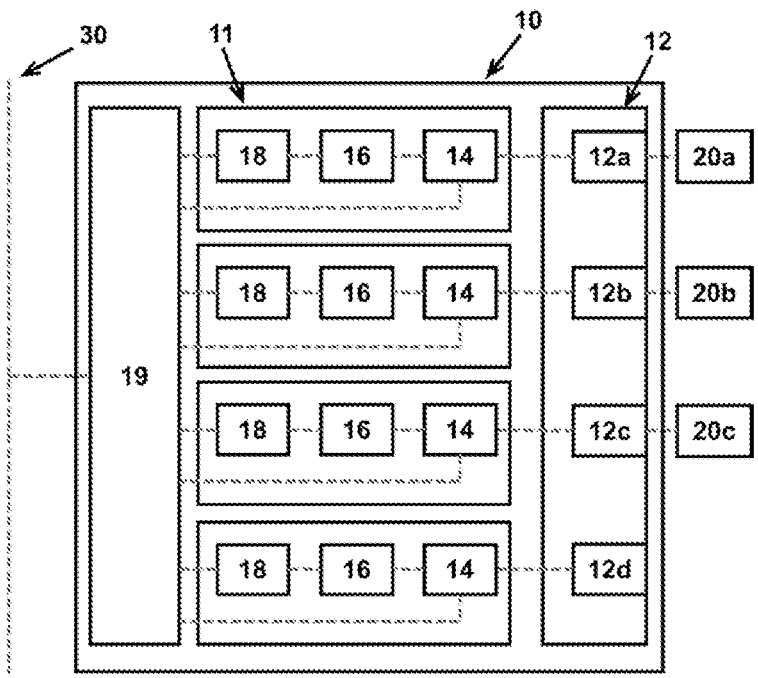
FIG. 1A shows an exemplary embodiment of the apparatus.

With reference to FIG. 1A, an exemplary embodiment of the device is explained.

In this exemplary embodiment, the apparatus 10 comprises a plurality of communication modules 11 and a peripheral module 12.

In a further exemplary embodiment, at least one communication module 11 is provided. Here, the communication modules 11 have essentially the same structure.

The peripheral module 12 and the communication modules 11 are coupled to each other. In the exemplary embodiment, the peripheral module 12 comprises field device interfaces 12a, 12b, 12c, 12d, which are optionally designed as ports or connections for field devices 20a, 20b, 20c.

In the exemplary embodiment, the ports 12a, 12b, 12c, 12d have substantially the same structure. Ports 12a, 12b, 12c, 12d are coupled to one of the communication modules 11, respectively.

Optionally, a coupling is provided between a communication module 11 and a port 12a, 12b, 12c, 12d by means of three lines, respectively, which are only shown schematically in FIGS. 1A to 1D.

The peripheral module 12 limits the applied voltage to the value required for the field device and modulates the corresponding communication signal onto it.

Further details of the peripheral module 12 are explained below with reference to FIG. 1D.

In the case shown here, the field device interfaces 12a, 12b, 12c, 12d are configured to be connected to the field devices 20a, 20b, 20c via a wired connection, respectively. Thus, an electrical connection is established that can be used to transmit data.

Optionally, the connection between the field device interfaces 12a, 12b, 12c, 12d can also be used to transmit electrical energy, optionally to provide an operating voltage of a field device 20a, 20b, 20c and/or a measuring device to the field device 20a, 20b, 20c.

In a further exemplary embodiment, at least one field device interface 12a, 12b, 12c, 12d is configured to establish a wireless connection to a field device 20a, 20b, 20c, optionally via radio communication.

In the example, each of the communication modules 11 includes a switching unit 14 which is coupled to a HART master device 16 which in turn is coupled to a protocol conversion unit 18.

Further, in the exemplary embodiment, the protocol conversion unit 18 is coupled to a communication interface 19 which in this case is an Ethernet switch 19.

Moreover, in the exemplary embodiment, the switching unit 14 is also directly coupled to the communication interface 19.

In the case shown, multiple field device interfaces 12a, 12b, 12c, 12d are provided. Here, the protocol conversion units 18 and switching units 14 are coupled to the communication interface 19, respectively.

In another exemplary embodiment, the communication module 11 may be a stand-alone unit that already comprises a communication interface 19. An example of such a configuration is explained in more detail below with reference to FIG. 1C.

The communication interface 19 couples the apparatus 10 to the communication system 30, which in this example is an Ethernet-compatible bus system 30.

Figure 1B:
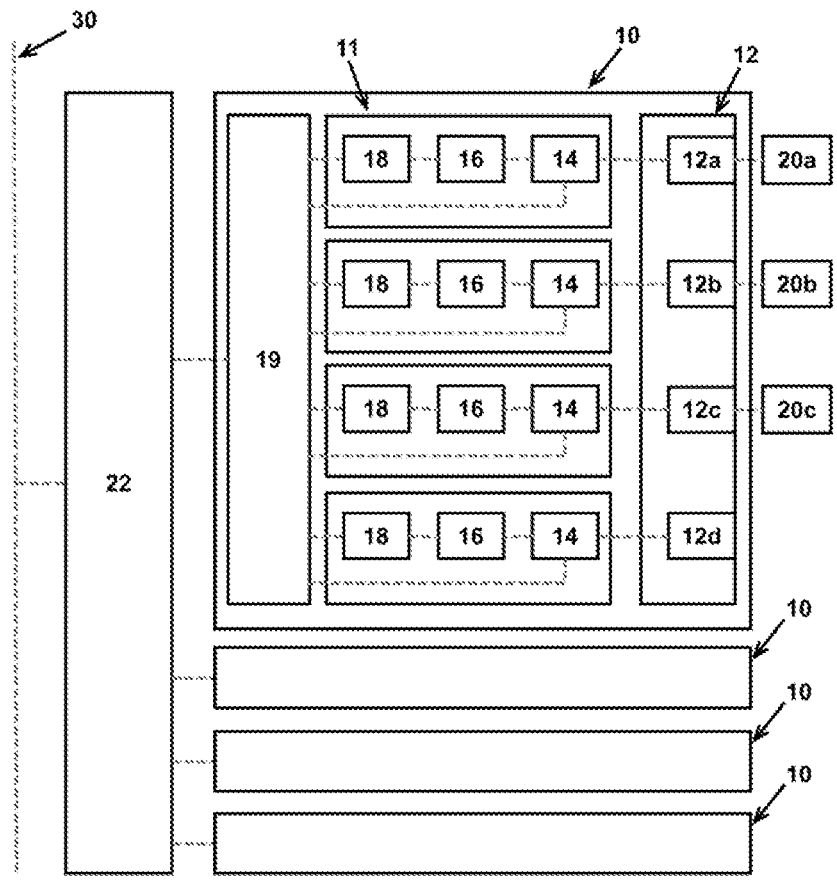
FIG. 1B shows another exemplary embodiment of the apparatus as a module in a remote I/O system.

With reference to FIG. 1B, a further exemplary embodiment of the device as a module in a remote I/O system is explained. This is based on the exemplary embodiment of the apparatus explained above. Functionally or structurally identical or comparable elements are marked with the same reference signs.

The system shown exemplary here comprises a plurality of apparatuses 10 that are substantially analogous to each other. They may differ, for example, in the number of communication modules 11 and/or ports 12a, 12b, 12c, 12d provided.

The apparatuses 10 are designed as remote I/O modules.

The apparatuses 10 are coupled to a remote I/O gateway 22 via their communication interface 19.

Optionally, the communication interfaces 19 of the apparatuses 10 or the remote I/O modules may be connected to an internal module bus downstream of which the remote I/O gateway 22 is arranged.

The communication to the bus system 30 takes place via the remote I/O gateway 22.

The remote I/O system makes it possible to provide a large number of field device interfaces 12a, 12b, 12c, 12d and to distribute them very flexibly, even spatially in the field. This enables, for example, central control and monitoring of field devices 20a, 20b, 20c, even if they are arranged widely scattered.

In another exemplary embodiment, instead of a plurality, it may be provided that only one apparatus 10 is coupled to the bus system 30 as a single remote I/O module via the remote I/O gateway 22.

Figure 1C:
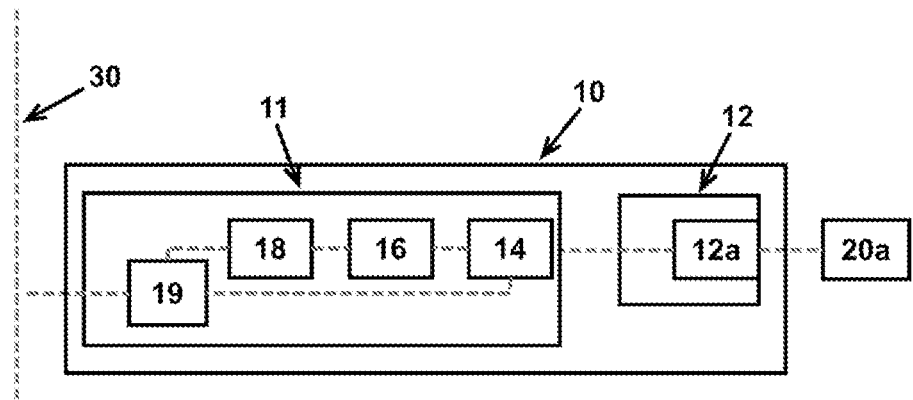
FIG. 1C shows another exemplary embodiment of the apparatus as a stand-alone solution.

With reference to FIG. 1C, a further exemplary embodiment of the apparatus 10 as a standalone solution is explained. Here, too, the example of the device explained above is taken as a basis. Functionally or structurally identical or comparable elements are marked with the same reference signs.

In this exemplary embodiment, the apparatus 10 comprises only one communication module 11 and only one peripheral module 12. Accordingly, a port 12a is provided to which a field device 20a can be connected.

The communication module 11 is constructed as described above. It comprises a switching unit 14, a HART master device 16, and a protocol conversion unit 18, as well as a communication interface 19.

The apparatus 10 is coupled to the bus system 30 via the communication interface 19.

Figure 1D:
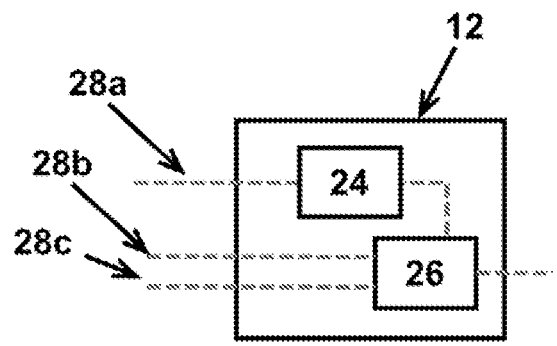
FIG. 1D shows a detailed view of a peripheral module of the apparatus.

With reference to FIG. 1D, a detailed view of a peripheral module of the device is explained. The examples of the device and the peripheral modules 12 explained above are taken as a basis. Functionally or structurally identical or comparable elements are provided with the same reference signs.

In this exemplary embodiment, the peripheral module 12 comprises a voltage limiter 24 and a modulation unit 26. The peripheral module 12 is shown here with only one port to a field device 20a, 20b, 20c (not shown in the figure).

In the example, the peripheral module 12 is coupled to the communication module 11 (not shown in the figure) via three lines 28a, 28b, 28c shown schematically.

One of the lines 28a is connected to a voltage limiter 24. The voltage limiter 24 is configured to bring the voltage applied via the line 28a to a value required for the connected field device 20a, 20b, 20c or to prevent excessive voltage values. The voltage limiter 24 is in turn coupled to the modulation unit 26.

The modulation unit 26 is coupled to the communication module 11 via two lines 28b, 28c. The modulation unit 26 is configured to receive a communication signal and modulate it onto a provided voltage.

In further exemplary embodiments, the peripheral module 12 may be connectable to field devices 20a, 20b, 20c via a plurality of ports 12a, 12b, 12c, 12d. In this case, a separate voltage limiter 24 and a separate modulation unit 26 are provided for each port 12a, 12b, 12c, 12d.

Figure 2:
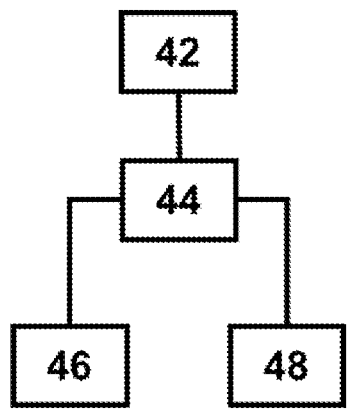
FIG. 2 shows an exemplary embodiment of the method for connecting a filed device to a communication system.

With reference to FIG. 2, an exemplary embodiment of the method is explained. This is based on the exemplary embodiment of the device explained above, which is also specified in more detail below.

In a first step 42, a field device 20a, 20b, 20c is connected to one of the field device interfaces 12a, 12b, 12c, 12d of the apparatus 10. The connection is recognized by the current consumption of the field device and an operation is started to recognize the protocol used by the connected field device 20a, 20b, 20c.

Further, this step 42 may also be performed when a field device 20a, 20b, 20c connected to a field device interface 12a, 12b, 12c, 12d is restarted or initiated.

In the exemplary embodiment, in a further step 44, the recognition of the protocol is performed. In this exemplary embodiment, it is provided that the apparatus 10 is suitable for connecting field devices 20a, 20b, 20c that communicate according to the HART protocol or via an Ethernet-compatible protocol.

It is first checked whether the connected field device 20a, 20b, 20c communicates via the Ethernet protocol. For this purpose, the voltage limiter 24 is set to the voltage limitation typical for APL and a standard signal is modulated onto it.

If thereby an Ethernet-compliant communication behavior of the connected field device 20a, 20b, 20c is obtained, then a direct connection from the switching unit 14 to the communication interface 19 is established in a step 46. That is, in this case, the port 12a, 12b, 12c, 12d to which the field device 20a, 20b, 20c is connected is set to parameters relevant to APL devices in terms of supply and data exchange, and a connection is established between the respective port 12a, 12b, 12c, 12d and the communication system 30.

If, on the other hand, no Ethernet-compatible connection is recognized, it is then checked whether the connected field device 20a, 20b, 20c can be addressed by means of a communication compatible with the HART protocol. For this purpose, the HART master device 16 is used, which attempts to address the connected field device 20a, 20b, 20c as a Hart slave device via the modulation unit 26. Port 12a, 12b, 12c, 12d is set to the current loop parameters required for HART field devices and a connection is established between port 12a, 12b, 12c, 12d and the HART master device 16. The HART master device 16 then attempts to establish a communication with the field device according to HART communication conventions.

If HART communication is possible, the protocol conversion unit 18 activates the connection to the communication system 30 in a step 48. The connected HART field device 20a, 20b, 20c can thereby communicate via HART IP.

The protocol conversion unit 18 takes over the task of providing an APL- or Ethernet-compliant communication interface with respect to the communication system 30 and implements it in such a way that the HART-compliant communication of the HART master device 16 with the field device 20a, 20b, 20c takes place.

An aspect of the disclosure is to provide an interface that supports different protocols, such as HART or APL. Depending on which protocol a connected field device 20a, 20b, 20c uses, the interface supplies the field device 20a, 20b, 20c via a Normenarbeitsgemeinschaft für Mess-und Regeltechnik (NAMUR) compliant 4-20 mA current loop and performs communication according to the HART protocol, or it is operated with a voltage defined for APL tracks and allows Ethernet-based communication.

For example, this interface may be formed as part of a switch or as a module of a remote I/O system. For example, if an APL field device is recognized, it communicates via the Ethernet protocols associated with the field device 20a, 20b, 20c in the network. When a HART field device is connected, on the other hand, the 4-20 mA current loop required to supply the field device 20a, 20b, 20c becomes active and a HART master device takes over communication to the field device 20a, 20b, 20c.

The disclosure can then be implemented in a managed switch, for example.

In another exemplary embodiment, it may be provided that the device is operated as a module of a remote I/O system.

In existing Ethernet networks, field devices 20a, 20b, 20c can transmit additional variables, diagnostic data, and other data via HART IP communication.

In one exemplary embodiment, an apparatus 10 is provided, which includes a communication part 11 and a peripheral part 12. This apparatus 10 connects the connected field devices 20a, 20b, 20c to a higher-level communication system 30. A common port 12a, 12b, 12c, 12d is available to each APL and HART field device 20a, 20b, 20c, that is, field devices 20a, 20b, 20c for different protocols can be connected to the same port 12a, 12b, 12c, 12d. The port 12a, 12b, 12c, 12d is connected to a connection recognizer of the apparatus 10, which establishes a connection to a HART master device 16 or to the Ethernet switch 19, depending on the type of field device communication.

The connection recognizer controls the voltage limiter 24 initially to limit the voltages to values typical for APL devices. These values are usually below those of 4-20 mA HART field devices. Then the communication behavior of the field device 20a, 20b, 20c is checked: If it conforms to the behavior of an Ethernet-based communication, the port 12a, 12b, 12c, 12d is set to the parameters relevant for APL devices with regard to supply and data exchange. After successful connection recognition, a connection stage establishes a connection between port 12a, 12b, 12c, 12d and the higher-level communication unit 30.

If no Ethernet-based communication is recognized, port 12a, 12b, 12c, 12d is set to the current loop parameters required for HART field devices. The connection recognizer establishes a connection between port 12a, 12b, 12c, 12d and the HART master device 16 via modulation unit 26. HART master device 16 then attempts to establish a communication with the field device 20a, 20b, 20c according to conventions of the HART protocol. If a HART-compliant communication is possible, the protocol conversion unit activates the connection to the higher-level communication system 30, whereby the connected HART field device 20a, 20b, 20c becomes a HART IP device.

The field device 20a, 20b, 20c can now establish communication with the higher-level communication system 30 as well as receive and send data. The power supply to the field device 20a, 20b, 20c is also configured depending on the HART or APL or Ethernet protocol used.

This also results in economic advantages: A large number of 4-20 mA HART devices are typically installed in existing facilities that are being modernized. In modernization projects, these are usually not replaced due to their proven reliability, as long as there is no immediate need to do so. However, if digitization is the primary focus, devices with a particular focus on providing information can be converted to APL by replacing the electronics. A multiport device that supports both, HART and APL, allows parallel operation of both communication options here, even without installing the necessary infrastructure for APL to all field devices.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of" The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS 10 apparatus
11 communication module
12 peripheral module
12a, 12b, 12c, 12d field device interface; port; connection
14 switching unit
16 HART master device
18 protocol conversion unit
19 communication interface; ethernet switch
20a, 20b, 20c field device
22 remote I/O gateway
24 voltage limiter
26 modulation unit
28a, 28b, 28c line
30 communication system; bus system
42, 44, 46, 48 step

The invention claimed is:

1. An apparatus for connecting a field device to a communication system, the apparatus comprising:
a field device interface configured to connect the apparatus to the field device;
a communication interface configured to connect the apparatus to the communication system;
a protocol conversion unit; and
a switching unit,
wherein the switching unit is configured to recognize, from a plurality of protocols, the protocol used by the field device when the apparatus is connected to the field device and to establish a connection between the connected field device and the communication system via the protocol conversion unit if the recognized protocol is different from the protocol used by the communication system and to establish a direct connection between the connected field device and the communication system if the recognized protocol is a same as the protocol used by the communication system,
wherein the recognized protocol is a Highway Addressable Remote Transducer (HART) protocol, wherein the switching unit is further configured to establish the connection between the connected field device and the protocol conversion unit, and wherein the protocol conversion unit further comprises a HART master device.

2. The apparatus according to claim 1, wherein the communication system comprises a bus system.

3. The apparatus according to claim 1, further comprising a current loop configured to supply the connected field device with a current from 4 to 20 mA.

4. The apparatus according to claim 1, wherein the recognized protocol uses a transmission physics corresponding to an Advanced Physical Layer (APL) standard.

5. The apparatus according to claim 1, wherein the field device interface is configured to connect the apparatus to a plurality of field devices, and wherein at least two connected field devices from the plurality of field device use different protocols, respectively.

6. The apparatus according to claim 1, wherein the switching unit, when recognizing the protocol used by the field device, is configured to initially perform a connection recognition according to an Ethernet-based protocol and, if the Ethernet-based protocol is not recognized, to then perform a connection attempt using a HART protocol.

7. The apparatus according to claim 2, wherein the bus system is an Ethernet-based bus system.

8. A method of connecting a field device to a communication system, the method comprising:
providing a connected field device;
recognizing, from a plurality of protocols, the protocol used by the connected field device;
performing a protocol conversion if the recognized protocol is different from the protocol used by the communication system; and
establishing a connection between the connected field device and the communication system via a converted protocol if the recognized protocol is different from the protocol used by the communication system and establishing a direct connection between the connected field device and the communication system if the recognized protocol is a same as the protocol used by the communication system,
wherein the recognized protocol is a Highway Addressable Remote Transducer (HART) protocol, wherein the switching unit is further configured to establish the connection between the connected field device and the protocol conversion unit, and wherein the protocol conversion unit further comprises a HART master device.

* * * * *